(12) United States Patent
Kim (10) Patent No.: US 7,450,484 B2
(45) Date of Patent: Nov. 11, 2008

(54) REPRODUCING AND/OR RECORDING APPARATUS AND METHOD DETERMINING WHETHER SESSIONS ARE OPEN FOR A MEDIUM FOR REPRODUCTION AND/OR RECORDING

(75) Inventor: Jae-hyun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 666 days.

(21) Appl. No.: 11/189,855

(22) Filed: Jul. 27, 2005

(65) Prior Publication Data

US 2006/0023587 A1 Feb. 2, 2006

(30) Foreign Application Priority Data

Jul. 29, 2004 (KR) .................... 10-2004-0059841

(51) Int. Cl.
G11B 27/36 (2006.01)
(52) U.S. Cl. .................... 369/53.24; 369/124.15
(58) Field of Classification Search .......... 369/53.24, 369/124.15, 59.17
See application file for complete search history.

(56) References Cited

U.S. PATENT DOCUMENTS

| | | | |
|---|---|---|---|
| 4,630,252 A | | 12/1986 | Miura et al. |
| 5,317,549 A | * | 5/1994 | Maeda et al. ............ 369/53.24 |
| 5,526,329 A | * | 6/1996 | Bish et al. ............... 369/53.24 |
| 5,583,708 A | * | 12/1996 | Lee ............................ 360/50 |
| 5,694,382 A | | 12/1997 | Oliver et al. |
| 6,091,686 A | | 7/2000 | Caffarelli et al. |
| 6,243,340 B1 | | 6/2001 | Ito et al. |
| 6,556,525 B1 | * | 4/2003 | Takiguchi ................ 369/53.24 |

FOREIGN PATENT DOCUMENTS

| | | |
|---|---|---|
| GB | 2 336 021 A | 10/1999 |
| JP | 10-199154 | 7/1998 |

(Continued)

OTHER PUBLICATIONS

European Search Report issued May, 25, 2007 in corresponding European Patent Application No. 05254776.7-1232.

(Continued)

*Primary Examiner*—Thang V Tran
(74) *Attorney, Agent, or Firm*—Staas & Halsey LLP (57) ABSTRACT

An optical disc player and method reproducing data from an optical disc. The optical disc player may include a data reproducing module irradiating a laser signal onto the optical disc to reproduce a predetermined radio frequency signal corresponding to the data, and a controller determining that a reproduction area of the optical disc is an open session when the data reproducing module reproduces the radio frequency signal having a magnitude less than or equal a predetermined threshold value for a predetermined threshold time. The controller may reproduce the table of contents information recorded in a lead-in area of each session of the optical disc to check the magnitude of a reproduced radio frequency signal so as to determine whether each session is open. As a result, a rapid decision can be made as to whether each session is open to speedily complete a preparation for reproduction and recording from/to the optical disc.

19 Claims, 4 Drawing Sheets

FOREIGN PATENT DOCUMENTS

| | | |
|---|---|---|
| JP | 2001-110168 | 4/2001 |
| JP | 2002-117649 | 4/2002 |
| JP | 2003-109316 | 4/2003 |
| KR | 2003-0004520 | 1/2003 |

OTHER PUBLICATIONS

Chinese Patent Office Action, dated Sep. 1, 2006, and issued in related Chinese Patent Application No. 2005100881560.

* cited by examiner

REPRODUCING AND/OR RECORDING APPARATUS AND METHOD DETERMINING WHETHER SESSIONS ARE OPEN FOR A MEDIUM FOR REPRODUCTION AND/OR RECORDING

CROSS-REFERENCE TO RELATED APPLICATIONS

This application claims the benefit under 35 U.S.C. § 119 (a) from Korean Patent Application No. 2004-59841 filed on Jul. 29, 2004 in the Korean Intellectual Property Office, the entire disclosure of which is incorporated herein by reference.

BACKGROUND OF THE INVENTION

1. Field of the Invention

Embodiments of the present invention relate to recording and/or reproducing data from a medium, and more particularly, to an optical disc player and method rapidly determining whether a session on an optical disc is open or closed.

2. Description of the Related Art

Magnetic storage media which store data using magnetic fields, such as floppy disks, have small storage capacities and thus lack the capability to store more recent multimedia information. Thus, media such as optical discs have been developed to improve upon the storage capacity of magnetic discs. Such media have relatively large storage capacities, along with high-speed searches being possible with respect to the medium. As a result, the use of media such as optical discs has been growing rapidly. Examples of the optical disc include compact disc (CD)-read only memories (ROMs), digital versatile discs (DVDs), and the like, for example.

Here, an optical disc will be referred to as a recording medium on which data can be recorded and from which data can be reproduced using an optical method. As an example, uneven portions can be formed in a predetermined track on the optical disc using a laser light beam to record a "1" or "0" thereon, and accordingly, a reflected or projected light beam can be detected from the optical disc to reproduce the recorded data.

Data may be recorded in session units in the optical disc. A session can refer to a record area on an optical disc (CD, DVD, or the like) including one or more audio or data tracks. A track can further refer to an area on the optical disc in which data can be recorded and may be further divided into a plurality of sectors. In a case of a CD, a session may be similarly divided into multi-sessions in which data is recorded. The multi-sessions indicate that a bare CD is divided into several sessions to store data. In this case, if the last session is still open, the last session may be opened to store additional data.

Figure 1:
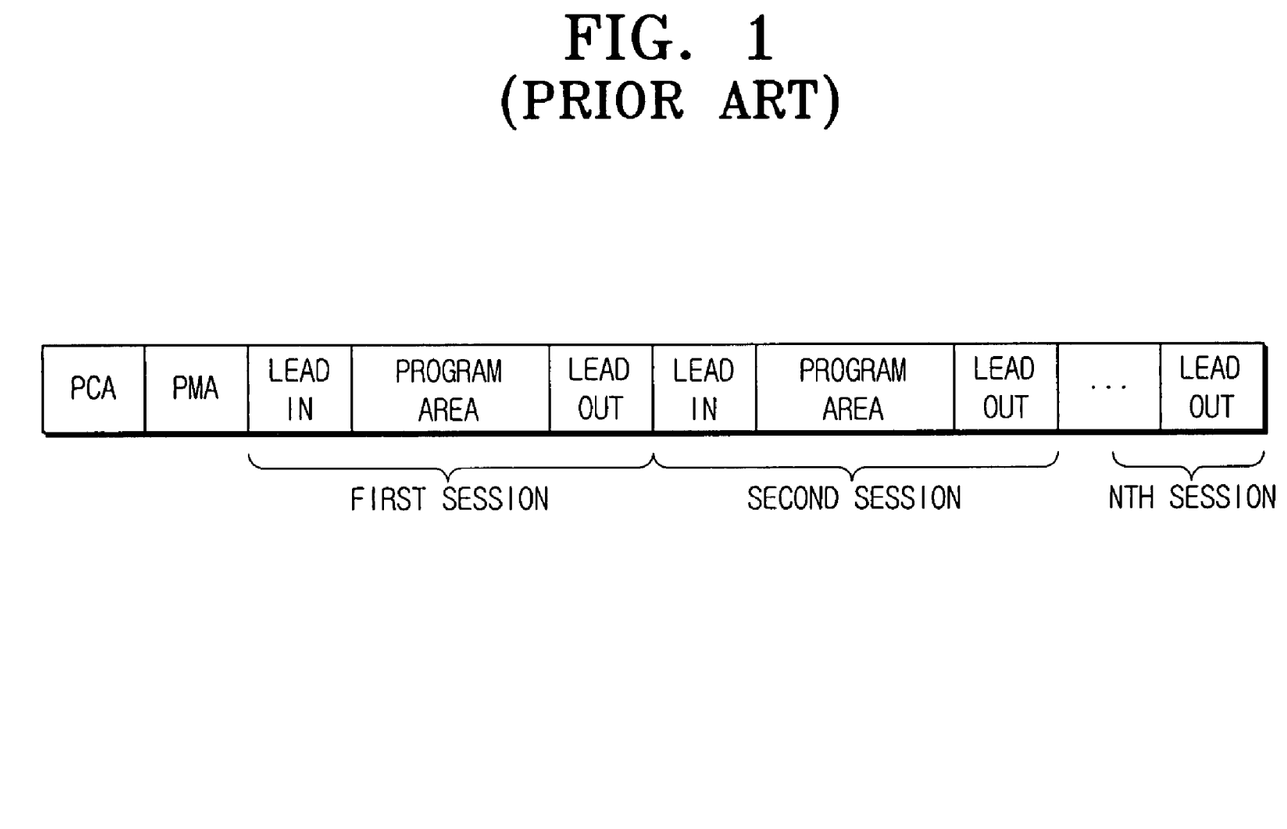
FIG. 1 illustrates a configuration of data recorded on an optical disc in a multi-session environment.

FIG. 1 illustrates a configuration of a multi-session into which an optical disc can be divided. Referring to FIG. 1, the multi-session can include a power calibration area (PCA), a program memory area (PMA), a first session, a second session, . . . , and an $n^{th}$ session, for example. Each of the first session, the second session, . . . , and the $n^{th}$ session can include a lead-in area, a program area, and a lead-out area.

The PCA can refer to an area reserved in a first part of a bare medium, e.g., a CD, to calibrate an optical pickup unit of an optical disc player, for example. The PMA can refer to an area that temporarily stores information regarding recorded contents, such as the track number, a start time, and an end time, and a disc ID, before a session is closed when recording with respect to a respective track of the session. The lead-in area can be a starting part of each of the first session, the second session, . . . , and the $n^{th}$ session, as well as an area that stores various types of information as to the state of the CD. The lead-in area can store information regarding the capacity of the CD, the maker, and the like, of the CD, including the table of contents (TOC) information as to each respective session that is closed. The program area can be a substantial area in which a user can record data, and the lead-out area can indicate that the recording of data is completed and that a corresponding session ends.

When the user records data on an optical disc, for example, the user can set an option to selectively open or close a session. When the user selects to open an available session, the user can record additional data on the optical disc. However, when the user selects to close the session, the user cannot record data on the optical disc any more.

When the optical disc is mounted, a central processing unit (CPU) of the optical disc player checks the TOC information recorded in the lead-in area of each of the first session, the second session, . . . , and the $n^{th}$ session to determine the number of sessions and whether the sessions are closed. Thus, the CPU completely checks the TOC information as to all of the first session, the second session, . . . , and the $n^{th}$ session, and the CPU can then perform reproduction of data, starting from the first session.

Although the CPU can perform reproduction with respect to the lead-in area of the $n^{th}$ session during sequential checking of the TOC information of each of the first session, the second session, . . . , and the $n^{th}$ session, the CPU cannot recognize that the $n^{th}$ session is the last session. Therefore, the optical pickup unit moves to a predicted position to search a lead-in area of a next session, even though the next session may be unrecorded. Accordingly, the conventional optical disc player requires a large amount of time to determine that the next current position of the optical pickup unit is a data unrecorded area.

Since pits indicating data, for example, may not be recorded in the data unrecorded area, a laser signal for reproducing data is almost totally reflected from the data unrecorded area. Thus, when a long time is required to determine that the current position of the optical pickup unit is the data unrecorded area, the optical pickup unit may not normally track the data unrecorded area. Accordingly, an error may occur during the search for the TOC information, and thus data may not be reproduced. Also, since only the remaining sessions, except for an open session, are recognized, reproduction may be performed with respect to only the remaining sessions.

SUMMARY OF THE INVENTION

Accordingly, embodiments of the present invention solve the above-mentioned problems. An aspect of the present invention is to further provide an optical disc player and method checking a magnitude of a signal reproduced from an optical disc to rapidly determine whether a session is open.

Another aspect of the present invention is to provide an optical disc player and method determining whether a session is open to determine whether data is recordable when a data recording command is input.

To achieve the above and/or other aspects and advantages, embodiments of the present invention include a recording and/or reproducing apparatus, including a data reproducing module to irradiate a light beam onto a medium to produce a radio frequency signal capable of corresponding to data recorded on the medium, and a controller to determine whether a reproduction area of the medium is an open session when the produced radio frequency signal has a magnitude less than or equal to a predetermined threshold value for a predetermined threshold time.

The recording and/or reproducing apparatus may be a optical disc recording and/or reproducing apparatus and the medium is an optical disc.

In addition, the controller may determine that the an area of the medium irradiated by the light beam is a closed session if the produced radio frequency signal magnitude is greater than the predetermined threshold within the predetermined threshold time. Further, the medium may be recorded to if the medium is in a closed session state, identified by a last session of the medium being closed.

The recording and/or reproducing apparatus may further include a timer, wherein when the controller determines that the magnitude of the produced radio frequency signal is less than or equal to the predetermined threshold value, the controller controls the timer to start counting time expended to detect the radio frequency signal as corresponding to the data recorded on the medium. A memory may be used to store information of the predetermined threshold value and the predetermined threshold time, wherein the controller reads the information of the predetermined threshold time from the memory to compare the predetermined threshold time with the time counted by the timer.

When the medium is mounted, the controller may reproduce table of contents information recorded in respective lead-in areas of each session of the medium and respectively checks the magnitude of the produced radio frequency signal to determine whether each session is open.

In addition, the recording and/or reproducing apparatus may include a data recording module to irradiate the light beam onto the medium to record data on the medium, and a key signal input unit to input a data recording command to initiate recording of the data to the medium, wherein, when the data recording command is input, the controller determines whether the optical disc is in an open session state to control the data recording module to record the data to the medium. The apparatus may also include an output unit to output a warning message, wherein, when the data recording command is input, the controller controls the output unit to output the warning message warning that the data cannot be recorded to the medium if the medium is in a closed session state.

To achieve the above and/or other aspects and advantages, embodiments of the present invention include a recording and/or reproducing method determining whether a medium is in an open session state, including irradiating a light beam onto the medium to produce a radio frequency signal capable of corresponding to data recorded on the medium, determining whether a magnitude of the produced radio frequency signal is less than or equal to a predetermined threshold value, counting a time expended to detect the radio frequency signal as corresponding to the data recorded on the medium, if the magnitude of the radio frequency signal is less than or equal to the predetermined threshold value, and determining that an area onto which the light beam is irradiated is an open session if the counted time is greater than or equal to a predetermined threshold time. Here, the medium may be an optical disc.

The method may further include determining an area of the medium irradiated by the light beam to be a closed session if the produced radio frequency signal magnitude is greater than the predetermined threshold within the predetermined threshold time. Further, the medium may be recorded to if the medium is in a closed session state, identified by a last session of the medium being closed.

Irradiating of the light beam onto the medium to produce the radio frequency signal may further include irradiating the laser signal to a lead-in area of each session of the medium to produce the radio frequency signal capable of corresponding to table of contents information recorded in the lead-in area.

To achieve the above and/or other aspects and advantages, embodiments of the present invention include a method of recording data onto a medium, including irradiating a light beam onto the medium to produce a radio frequency signal capable of corresponding to table of contents information recorded in each session of the medium, determining whether a magnitude of the produced radio frequency signal is less than or equal to a predetermined threshold value, counting a time expended to detect the radio frequency signal as corresponding to the table of contents information, if the magnitude of the produced radio frequency signal is less than or equal to the predetermined threshold value, determining that an area to which the light beam is irradiated is an open session if the counted time is greater than or equal to a predetermined threshold time, receiving a data recording command for the medium, and recording data to the medium, upon receipt of the data recording command, if the medium is in an open session state.

The method may further include outputting a warning message warning that the data cannot be recorded to the medium if the medium is in a closed session state.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Further, the following description provides the detailed construction and elements of different embodiments, noting that these are nothing but descriptions provided to assist in a comprehensive understanding of the invention. Thus, it should be apparent that embodiments of the present invention can be carried out without all the following defined matters.

Figure 2:
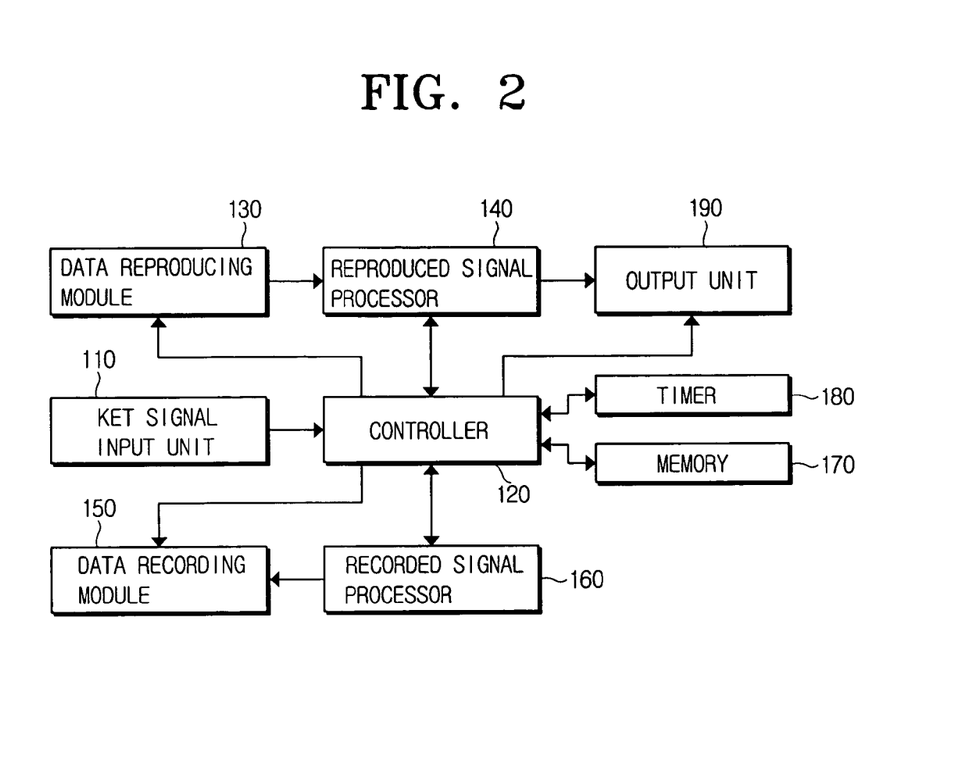
FIG. 2 illustrates an optical disc player, according to an embodiment of the present invention.

Accordingly, FIG. 2 illustrates an optical disc player, according to an embodiment of the present invention, noting that embodiments are not limited thereto and may include alternate recording and/or reproducing apparatuses. Referring to FIG. 2, the optical disc player may include a key signal input unit 10, a controller 120, a data reproducing module 130, a reproduced signal processor 140, a data recording module 150, a recorded signal processor 160, a memory 170, a timer 180, and an output unit 190, for example.

The key signal input unit 110 can recognize an external selection signal input by a user, and inform the controller 120 of the corresponding external selection signal. The user may input the external selection signal, such as a data reproduction command and/or a data recording command, using a button key or a remote controller provided in a body of the optical disc player, for example.

The data reproducing module 130 can scan a laser signal onto an optical disc to reproduce data from the optical disc, using an optical pickup unit (not shown), for example. When the optical pickup unit scans the laser signal onto the optical disc, the laser signal can be reflected or dispersed from pits formed in the surface of the optical disc. In other words, the laser signal can be dispersed from portions of the optical disc where the pits are formed (or where the pits protrude) and reflected from portions where the pits are not formed (or where the pits are dented), noting that such use of pits herein is for demonstrative purposes only and embodiments of the present invention are not limited thereto. Thus, reflected light may have a detectable varying reflection magnitude depending dispersion or reflection. In this case, reflected light having a maximum, constant magnitude can be detected from a data unrecorded area, e.g., a portion in which pits are not formed. The data reproducing module 130 can remove direct current (DC) components to prevent a DC component signal from being applied to a subsequent terminal so as to reproduce an RF signal having a predetermined form. The reproduced signal processor 140 can then convert the reproduced RF signal into a predetermined digital signal and output the converted predetermined digital signal via the output unit 190.

As an example, when an optical disc is mounted, the controller 120 can start to search for TOC information to determine the number of sessions recorded on the optical disc and whether the sessions are closed. When data is stored in the multi-session manner, the controller 120 can control the data reproducing module 130 to sequentially reproduce TOC information recorded in each lead-in area of each of the sessions. As described above, each of the sessions may be divided into a lead-in area, a program area, and a lead-out area. When the controller 120 checks the lead-in area of the last session to confirm that the last session is closed, the controller 120 completes a preparation for reproduction with respect to the optical disc.

When the controller 120 checks the lead-in area of the last session to identify that a last session is not closed, while sequencing through the sessions the controller 120 moves the optical pickup unit to a predicted position of the lead-in area of a session to scan a laser signal. Thus, the controller 120 may check the magnitude of an RF signal reproduced from the predicted position to determine whether the session is open. In other words, when the session is open, TOC information will be not recorded in the lead-in area thereof. Therefore, the lead-in area of the open session is a data unrecorded area, and thus the magnitude of the reproduced RF signal will be less than or equal to a predetermined threshold value. When the controller 120 determines that the RF signal less than or equal to the predetermined threshold value has been detected, the controller 120 can determine whether the time required for detecting the RF signal has exceeded a predetermined threshold time. If the controller 120 determines that the time required for detecting the RF signal time exceeds the predetermined threshold time, the controller 120 determines that the session is open and completes a preparation for reproduction with respect to the optical disc. Accordingly, in a case where it is not known whether a session is closed, the controller 120 can rapidly determine whether the session is open.

The controller 120 may use the timer 180 to count the time required for detecting the RF signal. To be specific, the controller 120 can drive the timer 180 from the time when the RF signal less than or equal to the predetermined threshold value is detected, to count a lapse of time, for example. The controller 120 may additionally store information as to the predetermined threshold value and the predetermined threshold time in the memory 170, for example. The controller 120 may then read the information as to the predetermined threshold value from the memory 170 during the search for the TOC information to compare the predetermined threshold value with the reproduced RF signal.

When the preparation for the reproduction of the optical disc is completed, the data reproduction command can be input via the key signal input unit 110. The controller 120 can then control the data reproducing module 130 and the reproduced signal processor 140 to perform reproduction from the program area of the first session.

When the data recording command is input via the key signal input unit 110, the controller 120 determines whether data is recorded, depending on whether the last session is still open. In other words, when the controller 120 determines that the last session is open, the controller 120 controls the data recording module 150 to record data. The recorded signal processor 160 can then convert predetermined data input from an external source into a recordable signal to be recorded. Thus, the data recording module 150 calibrates the optical pickup unit to irradiate the laser signal onto the optical signal so as to record the data.

When the controller 120 determines that the last session is closed, the controller 120 may control the output unit 190 to output a predetermined warning message for warning that the data cannot be recorded, for example. The output unit 190 may output the warning message in an image or sound signal form using a liquid crystal display (LCD) panel, a light emitting diode (LED), a speaker, etc.

Figure 3:
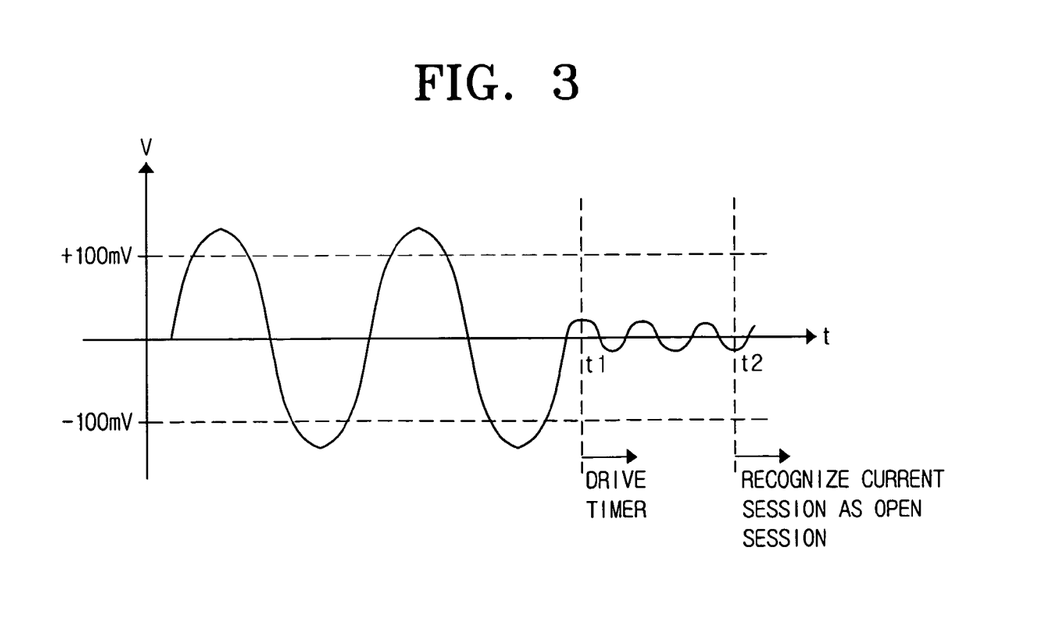
FIG. 3 illustrates a waveform of a radio frequency (RF) signal reproduced from an optical disc, according to an embodiment of the present invention.

FIG. 3 is a graph illustrating a waveform of an RF signal reproduced from the optical disc. Referring to FIG. 3, when the laser signal is irradiated to a data recorded area of the optical disc, an RF signal of an alternating current (AC) waveform having an amplitude of a predetermined magnitude can be reproduced from the data recording. In this case, the RF signal can be detected from the data recorded area so as to have at least a predetermined magnitude. However, the magnitude of the RF signal detected from the data unrecorded area is greatly reduced compared to the data recorded area. Thus, the predetermined threshold value may be appropriately set to determine whether the data is recordable based on the predetermined threshold value. The predetermined threshold value may be set based on the magnitude of the RF signal, the magnitude of the amplitude, or the like.

As shown in FIG. 3, the threshold value may be set to about ±100 mV based on the amplitude of the RF signal. In this case, the amplitude of the AC waveform is reduced from a time t1 to be less than or equal to the threshold value. In general, a DC waveform can be detected from the data unrecorded area, but the AC waveform having a small magnitude may be detected from the data unrecorded area, e.g., due to noise made by dust, foreign materials, or the like on the optical disc, as shown in FIG. 3. Thus, the controller 120 drives the timer 180 from the time t1 to count the lapse of time of the lowered amplitude. In this state, when the detected time exceeds the predetermined threshold time, due to the continuous detection of the RF signal less than or equal to the predetermined threshold value, the controller 120 may identify a current session to be an open session. As shown in FIG. 3, the predetermined threshold time may be "t2–t1." As described above, values recorded in the memory 170 may be used as the information as to the predetermined threshold value and the predetermined threshold time.

Figure 4:
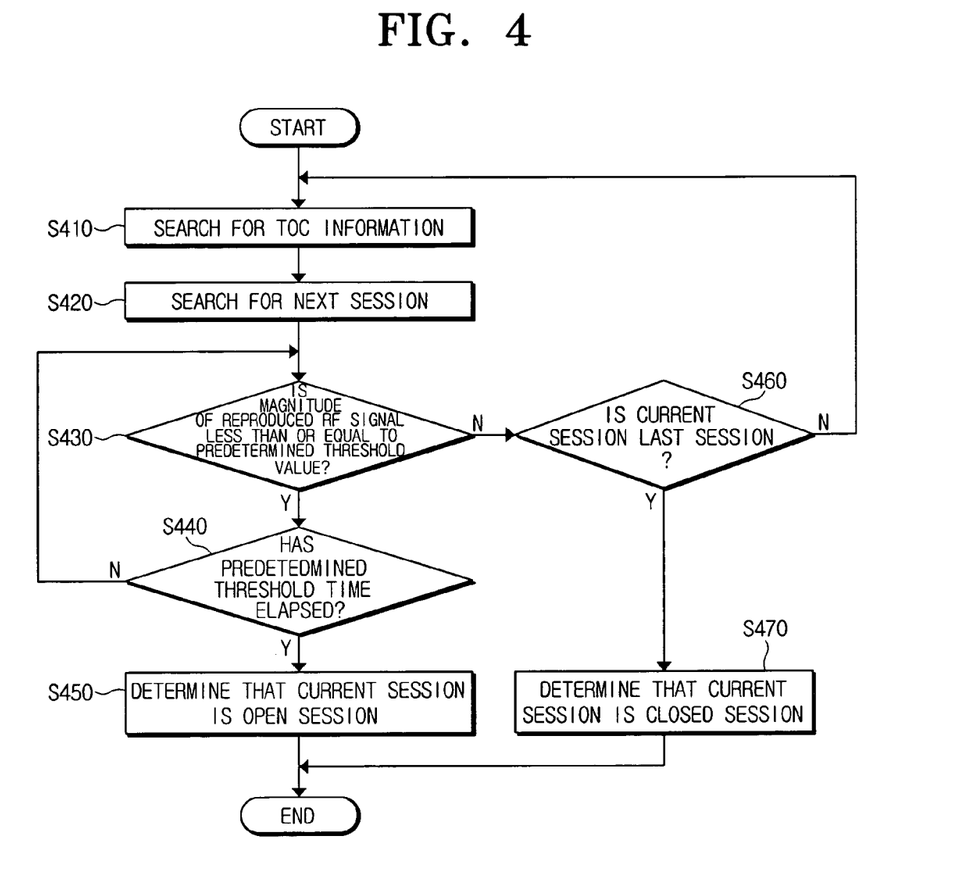
FIG. 4 is a flowchart of a method of determining whether a session is open, according to an embodiment of the present invention.

FIG. 4 is a flowchart of a method of determining whether a session is open, according to an embodiment of the present invention. Referring to FIG. 4, when the optical disc is mounted, the controller 120 can control the data reproducing module 130 to sequentially perform reproduction with respect to the lead-in area of each session. Thus, in operations S410 and S420, the controller 120 searches for the TOC information of each session.

In operation S430, the controller 120 determines whether the magnitude of the reproduced RF signal is less than or equal to the predetermined threshold value. For this purpose, the controller 120 can read the predetermined threshold value from the memory 170 to compare the predetermined threshold value with the magnitude of the RF signal.

If the controller 120 determines, in operation S430, that the magnitude of the RF signal is less than or equal to the predetermined threshold value the controller 120 can drive the timer 180 to check the lapse of time, in operation S440, so as to determine whether the RF signal less than or equal to the predetermined threshold value is detected for the predetermined threshold time or more. If the controller 120 determines, in operation S440, that the RF signal less than or equal to the predetermined threshold value was detected for at least the predetermined threshold time the controller 120 can determine that the current session is an open session, in operation S450, and may then end the search for the TOC information.

If the controller 120 determines, in operation S430, that the magnitude of the reproduced RF signal exceeds the predetermined threshold value the controller 120 can determine whether the current session is the last session, in operation S460, to determine whether to repeat the search for the TOC information up to a detected last session. Thus, if the controller 120 determines, in operation S460, that the current session is the last session the controller 120 can determine that the current session is a closed session, in operation S470, and ends the search for the TOC information.

Figure 5:
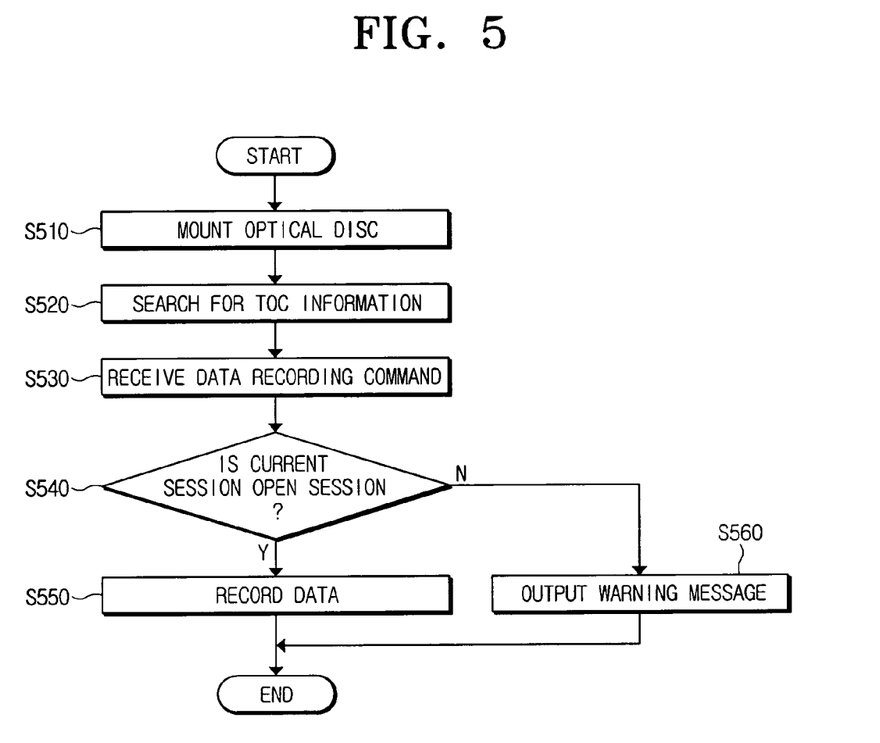
FIG. 5 is a flowchart of a method of recording data, according to an embodiment of the present invention.

If the data reproducing command is input in this state, reproduction is sequentially performed from the program area of the first session FIG. 5 is a flowchart of a method of recording data, according to an embodiment of the present invention. Referring to FIG. 5, in operation S510, the optical disc can be mounted. In operation S520, reproduction can be sequentially performed from the lead-in area of each session to check the TOC information. In this case, a decision can be made as to whether the last session is open based on the above method described with reference to FIG. 4.

In operation S530, the data recording command is input. In operation S540, it is determined whether the last session is an open session. If it is determined in, operation S540, that the last session is the open session the data to be recorded is recorded in the program area of the last session, in operation S550. If it is determined in, operation S540, that the last session is a closed session, in operation S560, a predetermined warning message for warning that the data is not recordable can be output. As a result, a user can be rapidly informed as to whether the data is recordable.

As described above, in recording and/or reproducing methods, media, and apparatuses, e.g., an optical disc player, it can be determined whether a session is open. According to embodiments of the present invention, a rapid decision can be made during a search for TOC information of each session of a medium, e.g., an optical disc, whether a last session is open. Thus, reproduction preparation time for an optical disc can be reduced. Also, an optical disc player can be prevented from malfunctioning caused by continuous reproduction when attempting to reproduce data from an unrecorded area. In other words, the number of all sessions can be exactly checked to perform reproduction from a first session to a last session. When a data recording command is input and the last session is a closed session, a warning message for warning a user that data cannot be recorded any more can also be output.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording and/or reproducing apparatus, comprising:
   a data reproducing module to irradiate a light beam onto a medium to produce a radio frequency signal capable of corresponding to data recorded on the medium; and
   a controller to determine whether a reproduction area of the medium is an open session when the produced radio frequency signal has a magnitude less than or equal to a predetermined threshold value for a predetermined threshold time.

2. The recording and/or reproducing apparatus of claim 1, wherein the recording and/or reproducing apparatus is a optical disc recording and/or reproducing apparatus and the medium is an optical disc.

3. The recording and/or reproducing apparatus of claim 1, wherein the controller determines that the an area of the medium irradiated by the light beam is a closed session if the produced radio frequency signal magnitude is greater than the predetermined threshold within the predetermined threshold time.

4. The recording and/or reproducing apparatus of claim 3, wherein the medium cannot be recorded to if the medium is in a closed session state, identified by a last session of the medium being closed.

5. The recording and/or reproducing apparatus of claim 1, further comprising a timer,
   wherein when the controller determines that the magnitude of the produced radio frequency signal is less than or equal to the predetermined threshold value, the controller controls the timer to start counting time expended to detect the radio frequency signal as corresponding to the data recorded on the medium.

6. The recording and/or reproducing apparatus of claim 5, further comprising a memory storing information of the predetermined threshold value and the predetermined threshold time,
   wherein the controller reads the information of the predetermined threshold time from the memory to compare the predetermined threshold time with the time counted by the timer.

7. The recording and/or reproducing apparatus of claim 1, wherein when the medium is mounted, the controller reproduces table of contents information recorded in respective lead-in areas of each session of the medium and respectively checks the magnitude of the produced radio frequency signal to determine whether each session is open.

8. The recording and/or reproducing apparatus of claim 1, further comprising:

a data recording module to irradiate the light beam onto the medium to record data on the medium; and a key signal input unit to input a data recording command to initiate recording of the data to the medium, wherein, when the data recording command is input, the controller determines whether the optical disc is in an open session state to control the data recording module to record the data to the medium.

9. The recording and/or reproducing apparatus of claim 8, further comprising an output unit to output a warning message, wherein, when the data recording command is input, the controller controls the output unit to output the warning message warning that the data cannot be recorded to the medium if the medium is in a closed session state.

10. A recording and/or reproducing method determining whether a medium is in an open session state, comprising:

irradiating a light beam onto the medium to produce a radio frequency signal capable of corresponding to data recorded on the medium;

determining whether a magnitude of the produced radio frequency signal is less than or equal to a predetermined threshold value;

counting a time expended to detect the radio frequency signal as corresponding to the data recorded on the medium, if the magnitude of the radio frequency signal is less than or equal to the predetermined threshold value; and determining that an area onto which the light beam is irradiated is an open session if the counted time is greater than or equal to a predetermined threshold time.

11. The recording and/or reproducing method of claim 10, wherein the medium is an optical disc.

12. The recording and/or reproducing method of claim 10, further comprising determining an area of the medium irradiated by the light beam to be a closed session if the produced radio frequency signal magnitude is greater than the predetermined threshold within the predetermined threshold time.

13. The recording and/or reproducing method of claim 12, wherein the medium cannot be recorded to if the medium is in a closed session state, identified by a last session of the medium being closed.

14. The method of claim 8, wherein irradiating of the light beam onto the medium to produce the radio frequency signal further comprises irradiating the laser signal to a lead-in area of each session of the medium to produce the radio frequency signal capable of corresponding to table of contents information recorded in the lead-in area.

15. A method of recording data onto a medium, comprising:

irradiating a light beam onto the medium to produce a radio frequency signal capable of corresponding to table of contents information recorded in each session of the medium;

determining whether a magnitude of the produced radio frequency signal is less than or equal to a predetermined threshold value;

counting a time expended to detect the radio frequency signal as corresponding to the table of contents information, if the magnitude of the produced radio frequency signal is less than or equal to the predetermined threshold value;

determining that an area to which the light beam is irradiated is an open session if the counted time is greater than or equal to a predetermined threshold time;

receiving a data recording command for the medium; and recording data to the medium, upon receipt of the data recording command, if the medium is in an open session state.

16. The method of claim 15, wherein the medium is an optical disc.

17. The method of claim 15, further comprising determining the area of the medium irradiated by the light beam to be a closed session if the produced radio frequency signal magnitude is greater than the predetermined threshold within the predetermined threshold time.

18. The method of claim 17, wherein the medium cannot be recorded to if the medium is in a closed session state, identified by a last session of the medium being closed.

19. The method of claim 15, further comprising outputting a warning message warning that the data cannot be recorded to the medium if the medium is in a closed session state.

* * * * *

UNITED STATES PATENT AND TRADEMARK OFFICE
CERTIFICATE OF CORRECTION

PATENT NO.        : 7,450,484 B2
APPLICATION NO. : 11/189855
DATED             : November 11, 2008
INVENTOR(S)       : Jae-hyun Kim It is certified that error appears in the above-identified patent and that said Letters Patent is hereby corrected as shown below:

Title Page, Column 2 item [57] (Abstract), Line 8, change "equal" to --equal to--.

Column 8, Lines 31-32, change "a optical disc recording" to --an optical disc recording--.

Column 8, Line 35, change "the an" to --an--.

Signed and Sealed this

Tenth Day of February, 2009

JOHN DOLL
*Acting Director of the United States Patent and Trademark Office*